Feb. 10, 1970  R. C. PASSAVANT ET AL  3,494,476
REVERSIBLE ROTATING SLUDGE SCRAPER
Filed May 10, 1968  2 Sheets-Sheet 1
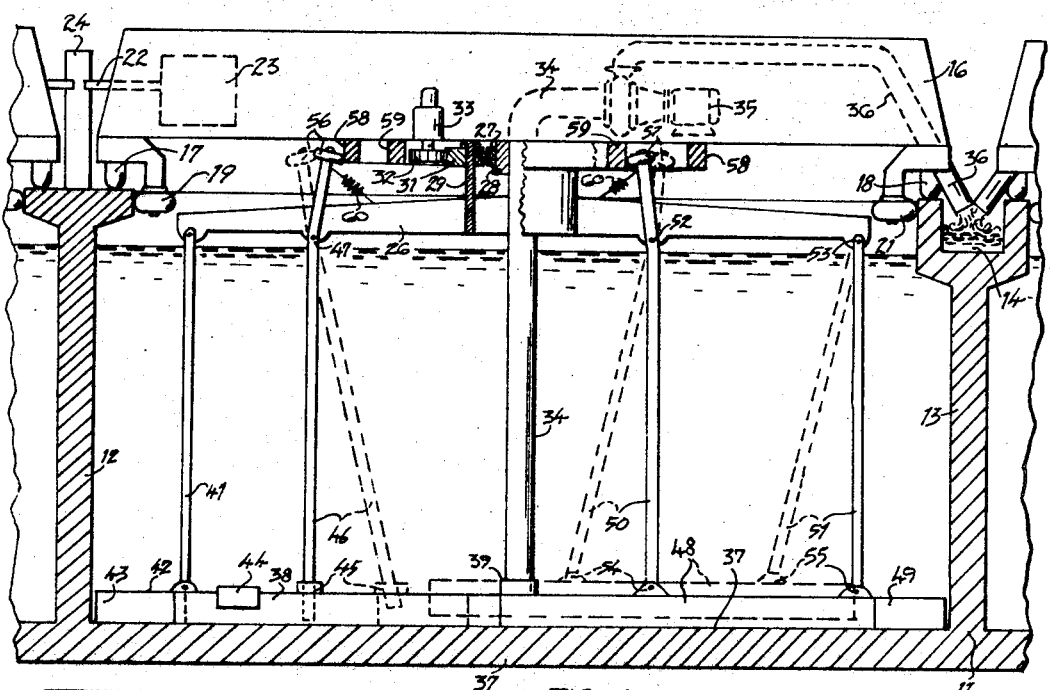
FIG. 1
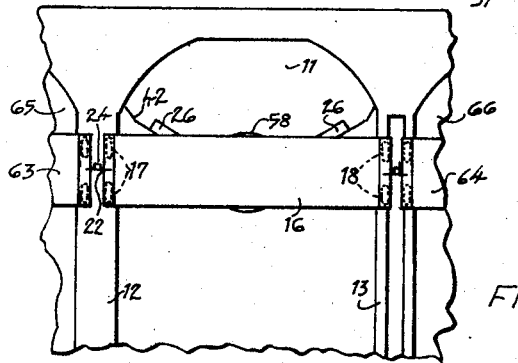
FIG. 2
INVENTOR.
RUDOLF CHRISTIAN PASSAVANT
LEONHARD EMIL FECHTER
BY
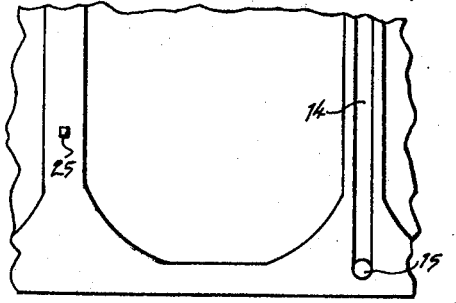

Feb. 10, 1970  R. C. PASSAVANT ET AL  3,494,476
REVERSIBLE ROTATING SLUDGE SCRAPER

Filed May 10, 1968  2 Sheets-Sheet 2

INVENTOR.
RUDOLF CHRISTIAN PASSAVANT.
LEONHARD EMIL FECHTER.
BY
Gerald A. Mathews
Agent United States Patent Office 3,494,476
Patented Feb. 10, 1970

3,494,476
REVERSIBLE ROTATING SLUDGE SCRAPER
Rudolf Christian Passavant, Michelbach, Nassau, and Leonhard Emil Fechter, Michelbacherhutte, Germany, assignors to Passavant-Werke, Michelbacherhutte, near Michelbach, Nassau, Germany
Filed May 10, 1968, Ser. No. 728,126
Claims priority, application Germany, May 16, 1967,
P 42,155
Int. Cl. B01d 43/00
U.S. Cl. 210—527                                 13 Claims

ABSTRACT OF THE DISCLOSURE

A rectangular clarifier tank is provided with a V-shaped sludge scraper blade assembly carried by a reciprocative bridge movable between opposite ends of the tank. When the bridge arrives at either end of the tank, the blade assembly is rotated to face the opposite end of the tank so that sludge is collected at the apex of the blade assembly during the succeeding bridge movement and is removed through a suction pipe supported by the bridge. During rotation of the blade assembly, movable segments thereof are positioned automatically in predetermined relation to the walls and floor of the tank by a novel guide mechanism to completely clean the areas of the tank floor adjacent the ends of the tank.

BACKGROUND OF THE INVENTION

Field of the invention

The present invention relates generally to the treatment of sewage or the like and more particularly to clarifier tank systems which are employed to effect separation of liquids and solids in sewage treatment installations. Still more particularly, the invention relates to an improved sludge collector arrangement in which a reciprocative scraper blade assembly collects sludge material from the bottom of a clarifier tank for removal therefrom during the movement of the blade in both directions.

Description of the prior art

In sewage disposal operations, clarifier tanks are commonly employed to effect separation of liquid and solid sewage by allowing the solid materials to settle out of the liquid and to be deposited on the floor of the tank. To remove the deposited materials, commonly referred to as sludge, a scraper blade is scraped along the floor of the tank to move the sludge to a location where it can be removed by an appropriate pumping device. Generally speaking, such installations are of two basic types; namely those in which a scraper blade is supported by a bridge movable back and forth along a generally rectangular tank, and those in which the blade moves continuously along an orbital path about the axis of a circular tank or around a central dividing wall or island of an elliptical tank. In the former type of previously known structure, the scraper blade generally is in contact with the bottom surface of the tank to perform its scraping function only during the movement of the bridge in one direction, and is raised out of contact with the tank floor while the bridge returns to its starting position. Thus, the scraper blade deposits the accumulated material in a collecting basin in the floor of the tank at the completion of each operative movement of the blade so that the sludge can be removed from the basin for further processing. Alternatively, the blade may be of V-shaped configuration so that the accumulated sludge material moves inwardly toward the apex of the blade where it is removed and delivered to a collecting trough along one side of the bridge path by a suction pipe carried by the bridge. In any such arrangement, however, it will be seen that the scraper blade is effective only intermittently because of the interruption required to return it to its initial starting position during each complete operating cycle. In a circular or elliptical clarifier tank, on the other hand, the scraper blade performs continuously and remains at all times in contact with the floor of the tank as it delivers the accumulated sludge either to a suction pipe carried by the corresponding bridge or into a continuous trough in the floor of the tank at one end of the blade. Therefore, the latter type of system is considerably more efficient from the standpoint of continuous operation, but may be less economical due to the space required to provide a tank of a given capacity and also because of the greater expenditure involved in building and maintaining the tank and bridge structures. Additionally, if such a system is provided with means for removing the collected sludge through a suction pipe carried by the bridge, expensive and troublesome underground piping is required to conduct the sludge from the dividing wall or island to an accumulation point beyond the tank, since it is obviously impractical to provide an open sludge collecting trough about the entire outer tank periphery.

SUMMARY OF THE INVENTION

The principal objective of the present invention is to combine the constructional and space saving advantages of a generally rectangular clarifier tank with the operating efficiency of a tank in which the scraper blade performs throughout a major portion of the time; and also to incorporate in the installation a simple and reliable sludge removal system in which the sludge is withdrawn through a suction pipe carried by the bridge and is deposited in an accessible channel formed in the top of a tank wall above the level of the liquid therein.

Most specifically, the present invention contemplates a generally rectangular clarifier tank provided with a reciprocative bridge member spanning the tank transversely and movable between one end of the tank and the other. The sludge scraper blade assembly is of V-shaped form and is suspended from the movable bridge so that the sludge material is accumulated at the apex of the blade and removed by a suction pipe which deposits it in an open channel running along the top of one of the lateral walls of the tank. When the bridge has moved the blade to its final position adjacent one end of the tank, the blade assembly is rotated through 180° so that it faces the opposite end of the tank; whereupon the bridge movement is reversed and the same sludge collecting and removing operation is repeated in the opposite direction. Since the ends of the V-shaped blade assembly are in close proximity to the walls of the tank during the movement of the bridge, the blade assembly is obviously too wide simply to be rotated through 180° without jamming against the tank walls. Accordingly, the blade assembly comprises movable blade segments which move radially toward and away from the axis of operation of the blade assembly during such movement thereof to maintain the tips of the outer blade segments in proximity to the tank walls at all times. Also, as the blade assembly rotates, the leading blade segment in the direction of rotation is raised above the floor of the tank to prevent it from removing sludge from the area of the tank floor within the path of the collector blade assembly during the subsequent movement of the bridge toward the opposite end of the tank.

Since the above-described mode of operation requires the segments of the collector blade to move longitudinally as they are thereby maintained in contact with the adjacent sidewalls of the tank, and also dictates vertical movement of one of the segments during the rotational movement of the entire blade assembly, another important objective of the invention is to provide means for supporting the blade assembly and for effecting such movement without the employment of complicated linkages or the like which would be adversely effected by the inhospitable environment of the sewage within which the blade segments must operate. To this end, the blade assembly is supported by simple and rugged support arms which cooperate with a novel guide track mechanism carried by the bridge above the tank to maintain the blade segments positively in proper relation to walls and floor of the tank.

Various means for practicing the invention and other advantages and features thereof will be readily apparent from the following detailed description of a preferred embodiment of the invention, reference being made to the accompanying drawings.

BRIEF DESCRIPTION OF THE DRAWINGS

The accompanying drawings are of somewhat schematic nature, with like reference numerals referring to like elements.

In the drawings:

FIG. 1 is an end elevational view of a sludge collector structure according to one improved embodiment of the invention, partially cross sectioned along radial planes parallel to the scraper blade members showing the scraper blade segments of the scraper blade assembly extended into contact with the parallel portion of the lateral walls of the depicted clarifier tank and indicating in broken lines illustrative positions of the respective blade segments during the rotational movement of the scraper blade assembly;

FIG. 2 is a fragmentary plan view of the clarifier tank and slulge collector structure illustrated in FIG. 1.

DESCRIPTION OF THE ILLUSTRATIVE PREFERRED EMBODIMENT

Figure 3:
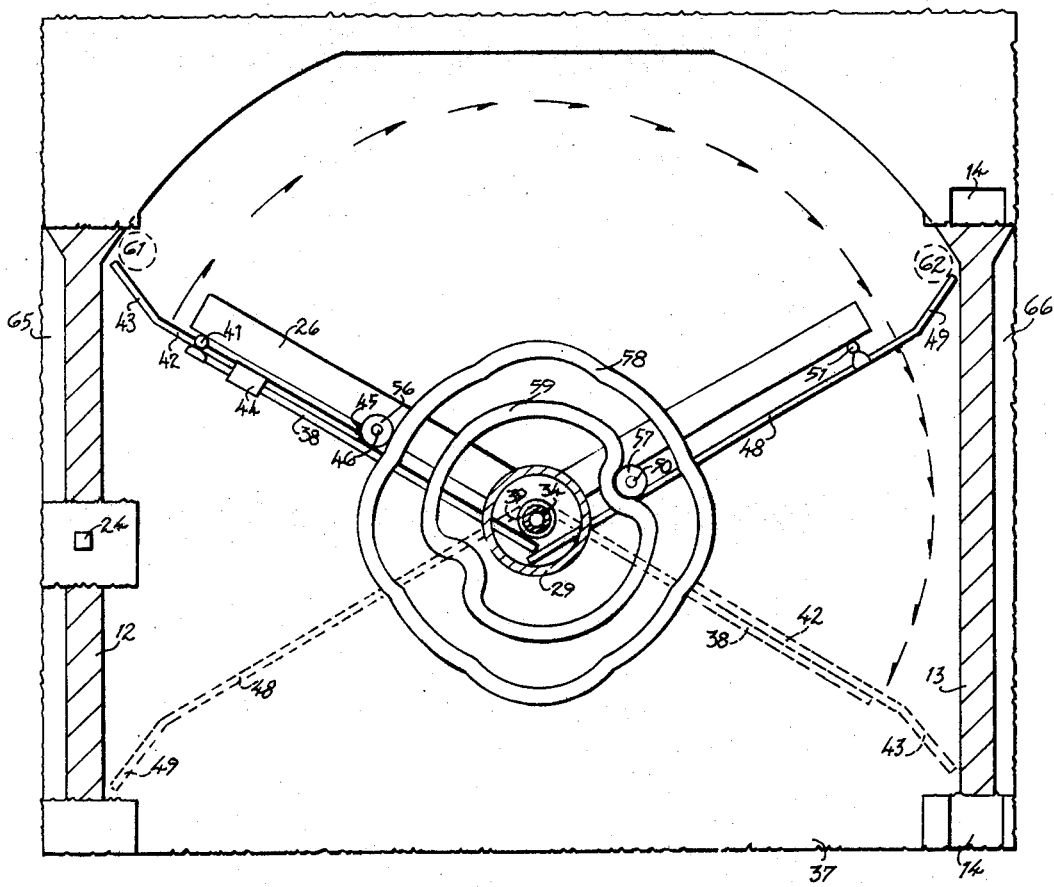
FIG. 3 is a plan view corresponding to an enlarged portion of FIG. 2 but omitting the bridge, per se, and depicts the means by which the scraper blade assembly is rotated to allow it to perform its intended function during the movement of the bridge in both directions.

Referring first to FIGS. 1 and 2 of the drawings, it will be seen that the depicted clarifier tank 11 is generally rectangular and rounded somewhat at its internal corners. The top portions of the lateral walls 12 and 13 of the tank are extended outwardly, with an elongate slightly sloping trough 14 being provided in lateral wall 13 so that sludge deposited in the trough will move therealong by gravity into a removal duct 15 leading to an appropriate pumping unit or the like. The movable bridge depicted at 16 is typical of the type presently used in conjunction with rectangular clarifier tanks and is supported at its opposite ends by support wheels 17 and 18 riding on the corresponding top surfaces of tank walls 12 and 13. Additionally, lateral guide wheels 19 and 21 engage the adjacent side surfaces of the widened top portions of the respective tank walls to maintain the bridge in centered transverse relation to the elongate tank. The bridge is propelled back and forth between the position shown in FIG. 2 and the corresponding position at the opposite end of the tank by conventional drive means adapted to apply tractive effort to the support wheels, or by cable means adapted to pull the bridge along the tank. When the bridge reaches either end of the tank, a control rod 22 attached to a control unit shown schematically at 23 comes into abutment with a corresponding stop post 24 or 25 and thereby controls the direction of movement of the bridge.

Below the bridge, a V-shaped blade support member 26 is rotatably suspended from the bridge by means of a bearing 27 supported by a stationary central hub member 28 to rotatably carry the tubular collar member 29 at the apex of the blade support member. A spur gear 31 encircling collar member 29 is meshed with a pinion gear 32 on the shaft of an electric motor 33. This motor, in turn, is controlled by the control unit 23 in a manner such that the blade support member rotates through 180° in a clockwise direction, as viewed from the top, whenever the bridge has reached either end of the tank and before it starts to move back in the opposite direction. At the center of the bridge, a suction pipe 34, open at its bottom end, extends downwardly through hub member 28 and is connected to a pump unit 35 so that material pumped upwardly through pipe 35 is delivered into trough 14 through outlet pipe 36.

Adjacent the tank floor 37, a longitudinally immovable blade segment 38 is rotatably supported to suction pipe 35 by collar 39 and is attached at its outer end to the corresponding end of the blade support member 26 by a support rod 41. A shorter blade segment 42 provided with a slanted end portion 43 is maintained in overlapping relation to the outer end of blade segment 38 by an ear 44 hooked over the top edge of the latter member. Toward its inner end, the shorter blade segment is provided with another ear 45 including a hole adapted to receive the lower end of support rod 46 pivotally attached to the blade carrier member by pivot pin 47.

At the opposite side of the suction pipe, a third scraper blade segment 48, provided with a slanted end portion 49, is supported by parallel support rods 50 and 51 pivotally attached to blade segment 48 and to the blade support member by pivot pins 52 through 55. As shown in solid lines in FIG. 1, this blade segment is in contact with the floor of the tank and overlaps the inner end of segment 38 when support rods 50 and 51 are in a vertical position as shown in solid lines in FIG. 1. At their respective top ends, the two innermost support rods 46 and 50, which cooperate with the corresponding blade segments 42 and 48, are provided with guide rollers 56 and 57. These guide rollers, in turn, are adapted respectively to engage the outwardly facing lateral surfaces of guide track members 58 and 59 carried by the bridge member. To supplement the gravitational force tending to maintain the guide rollers in contact with the corresponding guide track members, spring loaded snubber members may also be provided as shown at 60.

As is best depicted in FIG. 3, both of the guide track members 58 and 59 are generally symmetrical and coaxial with suction pipe 34, with the outermost guide track 58 increasing in radius toward the ends and sides of the tank. Accordingly, when the above-described clockwise rotation of the blade support member takes place, as represented by the arrows in FIG. 3, guide roller 56 is moved outwardly as it encounters the radially larger portions of the guide track. Consequently, the lower end of support rod 46 moves inwardly toward the axis of rotation, as shown in broken lines in FIG. 1. Due to the slidable engagement between support arm 46 and ear 45 of blade segment 42, this angular inward movement of support rod 46 therefore allows that blade segment to remain in contact with the tank floor as it is slid radially to maintain the outer end thereof in close but non-abutting proximity to the adjacent tank wall.

Since blade segment 48 is supported toward both ends thereof by parallel support rods 50 and 51, however it will be seen that the inward movement of support rod 50 shown in broken lines in FIG. 1 will cause that blade segment to move inwardly and also to raise out of contact with the tank floor as shown in broken lines in FIG. 1. Although blade segment 48 could also be controlled by guide track member 58, an important consideration is that this blade segment is raised above the floor of the tank throughout a major portion of its rotational movement so that it does not remove accumulated sludge from the scraped area of the tank floor behind the scraper blade assembly so that the said accumulated sludge will be scraped during the subsequent movement of the bridge. Therefore, guide track member 59, which determines the radial position of blade segment 48, is profiled such that the latter blade segment will move inwardly and upwardly almost immediately following the commencement of the rotation of the blade support member and will remain in that raised position until such rotation has been almost completed.

From the foregoing, therefore, it will be evident by referenced FIG. 3 that the portion of the blade assembly comprising blade segments 38 and 42 collects sludge accumulated at the end of the tank as it rotates through 180° to the position shown in broken lines; while blade segment 48 simultaneously is lifted above the floor of the tank to render it temporarily inoperative. When the rotation of the blade support member has been completed, the respective blade segments are positioned as shown in broken lines in FIG. 3, whereupon the bridge moves toward the opposite end of the tank. Regardless of the direction of movement of the bridge and the corresponding position of the blade assembly, however, the sludge material moved toward the suction pipe by the angular configuration of the blade assembly is pumped upwardly through the suction pipe and delivered into trough 14. If desired, additional suction pipes could be provided along the blade segments by connecting such pipes to a manifold rotatably joined to the central suction pipe by means of an appropriate rotary connector member.

In addition to or in lieu of the above-described means for controlling the lateral movement of the blade segments by means of guide track members 58 and 59 and guide rollers 56 and 57 on the corresponding blade support rods, guide rollers engageable with the tank walls can be provided at the outer ends of blade segments 42 and 48 as indicated schematically in broken lines at 61 and 62 in FIG. 3.

From the foregoing description it will be apparent that the present invention provides simple and reliable means for achieving substantially continuous collection of sludge material from the bottom of an elongate rectangular clarifier tank, while at the same time eliminating the complications inherent in providing and maintaining submerged collection basins and the attendant inaccessible conduits or the like by which the collected sludge is withdrawn from such basins. Also, it will be apparent from FIG. 2 that a number of similar rectangular clarifier tanks can be arranged in lateral relation to one another so that each pair of tanks shares a sludge collecting trough provided along the wall member separating those two tanks. Correspondingly, while FIG. 2 shows independent bridge members 16, 63 and 64 spanning the respective tanks 11, 65, and 66, it obviously would be possible to carry the scraper blade assemblies of several such adjacent tanks on a common bridge member spanning all of those tanks. Furthermore, it should be recognized, that the subject reversible V-shaped collector blade assembly could also be employed in conjunction with a clarifier tank provided with a submerged continuous collecting basin or with a pair of collecting basins at opposite ends of the tank, which might prove advantageous in adapting the present scraper blade assembly for use with a previously existing tank.

We claim:

1. A sludge collector for removing sludge from the floor of a generally rectangular clarifier tank straddled by a bridge movable back and forth between predetermined locations adjacent opposite ends of said tank, said collector comprising:
    (a) a support member supported by said bridge for rotation about a substantially vertical axis,
    (b) a drive means for rotating said support member intermittently about said axis,
    (c) blade support means attached to and depending from said support member and,
    (d) a scraper blade structure located adjacent the floor of said tank and connected to said support member by said blade support means to effect rotation of said structure about said axis in response to corresponding rotation of said support member by said drive means, said blade structure comprising a plurality of blade segments extending in generally radial relation from said axis along two angularly disposed generally vertical planes to define a V-shaped blade assembly having its outer ends located closely adjacent the corresponding sidewalls of said tank when said assembly is rotationally oriented to face either end of said tank.

2. A sludge collector according to claim 1 in which said blade support means connects the two opposite outermost ones of said blade segments to said support member to maintain those segments in such V-shaped relation to one another while along radial movement thereof toward and away from the apex of said blade assembly.

3. A sludge collector according to claim 2 including blade positioning means for moving said outermost ones of said blade segments radially during and in response to rotation of said blade assembly to maintain the respective outermost end of at least one of said blade segments in close proximity to the wall surface of said tank adjacent thereto during such rotation.

4. A sludge collector according to claim 3 including blade lifting means for raising a predetermined one of said outermost blade segments above the floor of said tank during such rotation of said blade assembly.

5. A sludge collector according to claim 3 in which said blade support means comprises a pair of substantially vertical rods pivotally connecting the respective ones of said two outermost blade segments with said support member, said blade positioning means including stationary guide means carried by said bridge and operatively engaged by said rods to pivotally displace said rods in generally radial relation to said axis as a function of the rotational position of said support member.

6. A sludge collector according to claim 5 in which said stationary guide means comprises two horizontal substantially symmetrical guide track members carried by said bridge, said vertical rods including roller members engageable laterally with corresponding ones of said guide track members to effect such pivotal displacement of said rods as a function of the rotational position of said support members.

7. A sludge collector according to claim 1 including a suction pipe supported by said bridge with an open lower end of said pipe received within the apex of said blade assembly to remove sludge collected within the apex of said assembly adjacent said open end of said pipe.

8. A sludge collector according to claim 7 including:
    (a) pump means carried by said bridge to remove sludge from within the apex of said blade assembly through said suction pipe,
    (b) means defining an open trough running along the top of one of the lateral walls of said tank, and
    (c) a pump discharge pipe for discharging such sludge from said pump means into said trough.

9. A sludge collector for removing sludge from the floor of a generally rectangular clarifier tank straddled by a bridge movable back and forth between predetermined locations adjacent opposite ends of the tank, comprising:
    (a) a support member supported by said bridge for movement therewith and for rotation about a substantially vertical axis, and drive means for rotating said support member about said axis,
    (b) a scraper blade structure located adjacent the floor of said tank and operatively connected to said support member for movement therewith as the latter moves in said back and forth direction with the bridge and about said axis of rotation,
said scraper blade structure extending across the floor of the tank, to present a constant scraper blade surface extending across substantially the entire width of the tank and facing towards the direction of movement of the scraper blade structure during at least a major portion of the travel of the bridge and support member between the said predetermined locations at opposite ends of the tank, the blade structure being free from rotational movement about the said axis during the said major portion of its travel, said drive means being operable to turn the scraper blade structure, within said width 180°, such that the said constant surface of the blades are turned to face the opposite direction, while extending substantially across the entire said width of the tank, when the said blade structure reaches the said predetermined locations at the opposite ends of the tank, and including means operatively connected with the blades for causing movement of the blades during turning thereof such that sludge collected in front of the blade structure during movement in one direction is positioned in front of the blades after the blade structure has been turned 180° for movement in the opposite direction.

10. A sludge collector according to claim 9 wherein at least a portion of the ends of the rectangular tank are linear and extend generally perpendicular to the longer sides of the tank, and wherein the last said means includes means for retaining one end thereof substantially adjacent to the wall of the tank as the blade structure is turned 180°, while concurrently lifting the other end of the blade structure to avoid removing accumulated sludge from the area behind the blade structure as the blade structure is turned.

11. A sludge collector for removing sludge from the floor of a generally rectangular clarifier tank straddled by a bridge movable back and forth between predetermined locations adjacent opposite ends of the tank, comprising:
  (a) a support member supported by said bridge for movement therewith and for rotation about a substantially vertical axis, and drive means for rotating said support member about said axis,
  (b) a scraper blade structure located adjacent the floor of said tank and operatively connected to said support member for movement therewith as the latter moves in said back and forth direction with the bridge and about said axis of rotation,
said scraper blade structure extending across the floor of the tank, to present a constant scraper blade surface towards the direction of movement of the scraper blade structure during at least a major portion of the travel of the bridge and support member between the said predetermined locations at opposite ends of the tank, the blade structure being free from rotational movement about the said axis during the said major portion of its travel, said drive means being operable to turn the scraper blade structure, 180°, such that the said constant surface of the blades are turned to face the opposite direction only when the said blade structure reaches the said predetermined locations at the opposite ends of the tank, the scraper blade structure extending for substantially the entire width of the tank as the blade structure moves along the tank, and wherein at least a portion of the ends of the rectangular tank are linear and extend generally perpendicular to the longer sides of the tank, and including means for varying the overall length of the scraper blade structure such that one end thereof remains substantially adjacent the wall of the tank as the scraper blade structure is turned 180° at the end of the tank.

12. A sludge collector according to claim 11 wherein the scraper blade structure includes a pair of scraper blades extending outwardly along the floor of the tank, from an intermediate location in generally opposite directions, towards the walls of the tank, each of said blades being movable towards and away from the walls of the tank, the outer end of one of said blades constituting the said one end of the blade structure which remains substantially adjacent the wall of the tank as the scraper is turned 180°.

13. A sludge collector according to claim 12 including means for lifting the other said blade above the floor of the tank as the blade structure is turned 180°, to avoid removing accumulated sludge on the scraped tank floor area behind the blade structure as the blade structure is turned.

References Cited

UNITED STATES PATENTS 3,353,683  11/1967  Geiger _____ 210—527

OTHER REFERENCES

German printed application 1,168,354, April 1964, 1 sht. dwg. 2 pp. spec., 210–527.

JAMES L. DECESARE, Primary Examiner